United States Patent
Jeitner et al.

(10) Patent No.: US 7,723,673 B2
(45) Date of Patent: May 25, 2010

(54) DEVICE FOR DETECTING AMBIENT LIGHT AND LIGHT IN THE AREA IN FRONT OF A MOTOR VEHICLE

(75) Inventors: Martin Jeitner, Ostheim (DE); Haiko Glienicke, Salz (DE); Harald Schelbert, Gemünden am Main (DE); Dirk Vormann, Bad Neustadt (DE)

(73) Assignee: Preh GmbH (DE)

( * ) Notice: Subject to any disclaimer, the term of this patent is extended or adjusted under 35 U.S.C. 154(b) by 0 days.

(21) Appl. No.: 11/935,399

(22) Filed: Nov. 5, 2007

(65) Prior Publication Data

US 2008/0135738 A1 Jun. 12, 2008

Related U.S. Application Data

(63) Continuation of application No. PCT/EP2006/004191, filed on May 4, 2006.

(30) Foreign Application Priority Data

| May 4, 2005 | (DE) | ......................... 10 2005 021 336 |
| Nov. 21, 2005 | (DE) | ......................... 10 2005 055 306 |

(51) Int. Cl.
*H01J 5/02* (2006.01)
*G01J 1/44* (2006.01)

(52) U.S. Cl. ................................. 250/239; 250/214 AL

(58) Field of Classification Search ................. 250/216, 250/221, 239, 552, 551, 227.14, 227.11, 250/227.28, 227.31, 201.1, 575, 214 AL; 62/180, 244; 340/425.5, 469, 468, 600, 901; 356/445

See application file for complete search history.

(56) References Cited

U.S. PATENT DOCUMENTS

| 4,808,812 | A | * | 2/1989 | Tanaka et al. ................ 250/216 |
| 4,841,672 | A | * | 6/1989 | Nebhuth et al. ................ 49/25 |
| 4,890,460 | A | * | 1/1990 | Takasi et al. ................... 62/180 |
| 5,072,105 | A | * | 12/1991 | Osawa ....................... 250/206.1 |
| 6,185,950 | B1 | * | 2/2001 | Baruschke et al. ............. 62/244 |
| 6,781,106 | B2 | * | 8/2004 | Sumiya .................... 250/203.4 |
| 6,831,288 | B1 | * | 12/2004 | Schmitt et al. .............. 250/573 |
| 6,888,120 | B2 | * | 5/2005 | Chiasson et al. .......... 250/203.4 |
| 2004/0113053 | A1 | * | 6/2004 | Michenfelder et al. .. 250/214 R |

FOREIGN PATENT DOCUMENTS

| DE | 19630216 A1 | 1/1998 |
| EP | 1566654 A2 | 8/2005 |

* cited by examiner

*Primary Examiner*—Georgia Y Epps
*Assistant Examiner*—Jennifer Bennett
(74) *Attorney, Agent, or Firm*—Cantor Colburn LLP

(57) ABSTRACT

An ambient light sensor system is provided for sensing ambient light and light in the area in front of a motor vehicle, wherein the ambient light sensor system includes a light guide element arranged behind a transparent surface of the motor vehicle and at least two sensors arranged on the light guide element.

20 Claims, 3 Drawing Sheets

DEVICE FOR DETECTING AMBIENT LIGHT AND LIGHT IN THE AREA IN FRONT OF A MOTOR VEHICLE

This nonprovisional application is a continuation of International Application No. PCT/EP2006/004191, which was filed on May 4, 2006, and which claims priority to German Patent Application No. DE 102005021336 and DE 102005055306, which were filed in Germany on May 4, 2005 and Nov. 21, 2005, respectively, and which are all herein incorporated by reference.

BACKGROUND OF THE INVENTION

1. Field of the Invention

The present invention relates to an ambient light sensor system for integration in a motor vehicle for sensing the ambient light and for sensing the light in the area in front of the motor vehicle.

2. Description of the Background Art

More and more sensors are being built into modern motor vehicles to sense the weather and ambient conditions in the vicinity of the motor vehicle and to regulate or control corresponding systems in the motor vehicle. Thus, for example, it is known to place sensors in the vicinity of the windshield which detect the onset of rain or possible condensation on the inside of the glass. In addition, sensors are used which detect the light incident on the motor vehicle and pass the resultant signal to a regulating unit of an air conditioner in the motor vehicle, for example. Similarly, there are sensors that detect the light in the area in front of the motor vehicle, for example in order to detect the changing light conditions when approaching a tunnel and to take appropriate actions, such as automatically switching on the light, for instance. A wide variety of sensors and arrangements in the motor vehicle are known for detecting ambient light and the light in the area in front of the motor vehicle.

Known from DE 196 30 216 A1 is a travel-situation-dependent light control unit for a motor vehicle having an ambient light sensor system, wherein the ambient light sensor system has an ambient light sensor with a wide detection cone and also has a light sensor specific to the direction of travel with a narrow detection cone aimed in the direction of travel. In this context, the ambient light sensor is composed of a multiple quadrant solar position sensor, and the travel-direction-specific light sensor is composed of a light-sensitive photovoltaic cell. The detection cone of the travel-direction-specific light sensor, which is to say the light sensor that looks forward in the direction of travel, typically has an aperture angle of approximately 20°. The aperture angle here is delimited either by an optical lens or by a perforated diaphragm or by placement of the light-sensitive photovoltaic cell at the focal point of a parabolic mirror.

SUMMARY OF THE INVENTION

It is therefore an object of the present invention to provide an ambient light sensor system that makes it possible to sense and separately evaluate ambient light and the light in the area in front of the motor vehicle via a light guide element. In addition, the sensor arrangement should be as compact as possible, and should be simple in design and economical to manufacture.

Thus, an ambient light sensor system is provided, in that the ambient light sensor system includes a light guide element arranged behind a transparent area of the motor vehicle and at least two sensors arranged on the light guide element, and in that at least two edges are present in a surface associated with the transparent area, wherein a first edge delimits a first surface region through which the ambient light can be sensed, and wherein a second edge delimits a second surface region through which the light in the forward area can be sensed in the light guide element, and in that the area between the two edges is covered with a material that is impermeable to the spectral region of the light detected by the sensors.

The inventive design of the ambient light sensor system now makes it possible to provide, with the simplest design means and thus economically, an ambient light sensor system that allows for detection of ambient light and the light in the forward area by means of a light guide element in an extremely compact manner. In this connection, the edges worked into the surface of the light guide element for this purpose delimit a first region through which the ambient light enters the light guide element as well as a second region through which the light in the area in front of the vehicle strikes primarily the associated sensors placed behind the light guide element. In this context, the light guide element is preferably designed in a shape that can essentially be described as triangular. As a result of this triangular design, and the arrangement of the edges and the light-absorbing region on the side of the light guide element facing the transparent surface, chiefly the light in the forward area is guided to one side of the triangle, while the ambient light is guided to the other side of the triangle.

The light guide element has a cross-sectional shape that can be described as triangular, and has a spatial depth. In a preferred embodiment, the edges here extend parallel to the spatial extent of the light guide element. In an advantageous variant embodiment of the invention, the parallel edges extend essentially parallel to the top end of the windshield, and thus extend essentially horizontally, parallel to the vehicle's support surface, for example the road. In this context, the light guide element is glued to the inside of a windshield, for example. Because of the parallel edges in the light guide element, the light guide is thus divided into an upper region and a lower region, which are delimited by the edges. The ambient light is preferably sensed through the first upper region above the first and upper edge. The light in the area in front of the vehicle is sensed through the second region of the light guide element located below the second edge. In an advantageous variant embodiment of the invention, a projection is molded on the light guide element below the first region for sensing the ambient light, so that light incident vertically on the motor vehicle can also be guided vertically through the light guide element, and thus can be detected as ambient light by a sensor located below the projection.

The light in the forward area is preferably sensed through the region located below the second edge. It is a matter of course here that the two edges are spaced apart from one another. The light in the area in front of the vehicle that strikes the light guide element horizontally falls on the second region and is likewise transported horizontally through the light guide element to arrive at the vertically oriented side of the light guide element, where it is detected. In an advantageous embodiment of the light guide element, a spherical, domed or lenticular molded feature is attached to this vertical side, which on the one hand focuses the forward-area light and on the other hand eliminates the ambient light that is incident vertically on the light guide element. The molded feature focuses the light in the direction of a photosensitive sensor attached behind the molded feature.

The region located between the first upper region above the first edge and the second lower region below the second edge in the light guide element is coated or provided with a material that is selected for impermeability to the spectral region of the light sensed by the sensors. In this way, the two regions of light incidence can be clearly distinguished from one another. In an advantageous embodiment of the invention, the region between the two edges is designed as a V-shaped groove, as a result of which the areas of light incidence are delimited from one another still more sharply.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
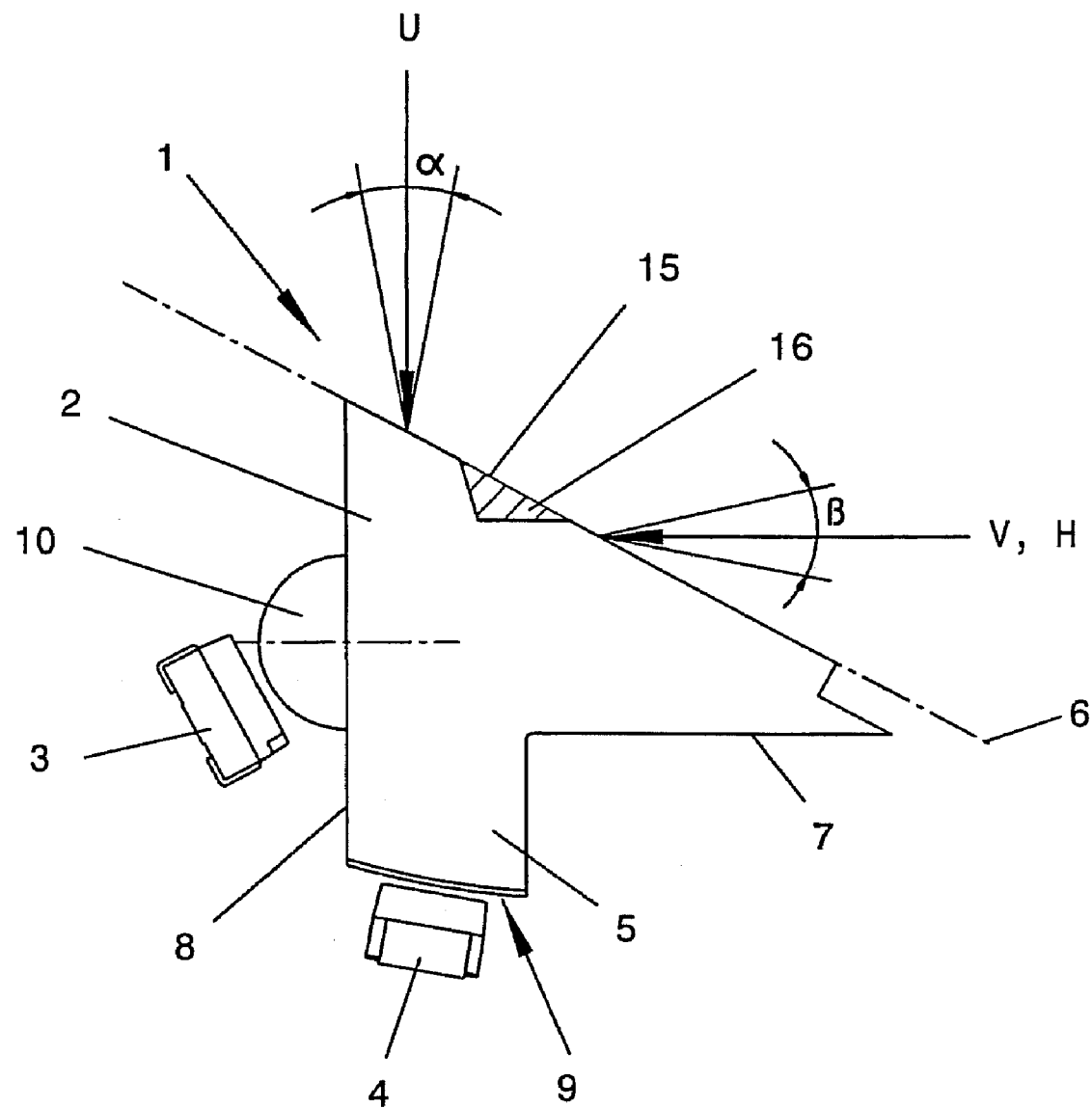
FIG. 1 illustrates a side view of an ambient light sensor system according to the invention.

FIG. 1 shows a sensor arrangement 1 in side view, which also can be called an ambient light sensor system 1. The sensor arrangement 1 includes a light guide element 2, which is arranged directly behind a windshield (not shown) of a motor vehicle, and includes a first photosensitive sensor 3 for detecting the light V in the area in front of the motor vehicle and a second photosensitive sensor 4 for detecting the ambient light U. The light guide element 2 is made of a conventional light-conducting plastic, and in this embodiment describes the rough shape of a triangle with a projection 5 in the direction of the sensor 4. The slope 6 represents essentially the angled path of a windshield located in the motor vehicle.

In the region of the angled path 6, the hypotenuse of the triangle of the light guide element 2, the light enters the light guide element through its entire length with the exception of the cross-hatched region of the stop 15. The light entering the light guide element 2 through the slope 6 is guided through the light guide element 2 and strikes the surfaces 7, 8 that are provided with a light-absorbing material and delimit the light guide element 2 and that surround the light guide element 2 on all external sides on which light is not introduced or passed on to the sensors 3, 4, or in other words enters or exits. These boundary surfaces 7, 8 are made in such a manner that they absorb light; for example they are made as black surfaces. At the boundary surface 9 of the projection 5 above the photosensitive sensor 4, the light entering the light guide 2 through the slope 6 exits the light guide element 2, striking the sensor 4. The incident light is then evaluated in the sensor 4 and the corresponding signal is passed on to a regulating or control unit in the motor vehicle.

Directly ahead of the photosensitive sensor 3 for evaluating the light V in the area in front of the motor vehicle, the light guide element 2 has a spherical, domed or lenticular molded feature 10 facing in the direction of the sensor 3. Light from the light guide element 2 likewise enters this molded feature 10 of the light guide element 2, which feature is molded onto the light guide element 2 as one piece. As a result of the spherical, domed or lenticular design of the molded feature 10, the light entering the light guide 2 is focused in the direction of the sensor 3. This focusing is used to obtain an unambiguous signal for the detection of the forward-area light V.

In a preferred variant embodiment of the invention, the boundary surface of the transparent surface 6 facing the windshield forms a rectangular base surface. A width of the rectangle of approximately 3 to 10 mm, preferably 5 to 7 mm, is possible in this connection. The projection 5 extends for approximately 8 to 15 mm, preferably 12 mm. The detectable angle of the ambient light U incident vertically on the sensor arrangement 1 lies in a range α at approximately 50°, and the evaluation of the forward-area light V lies in a range β at approximately 10 to 15°.

It should be noted here that the embodiment of the sensor arrangement 1 shown in FIG. 1 represents merely an example embodiment with respect to boundaries and dimensions, as well as the arrangement of the sensors 3, 4 and the design of the light guide element 2. The essential feature of the invention is the selective detection and evaluation of the forward-area light V and the ambient light U.

Figure 2:
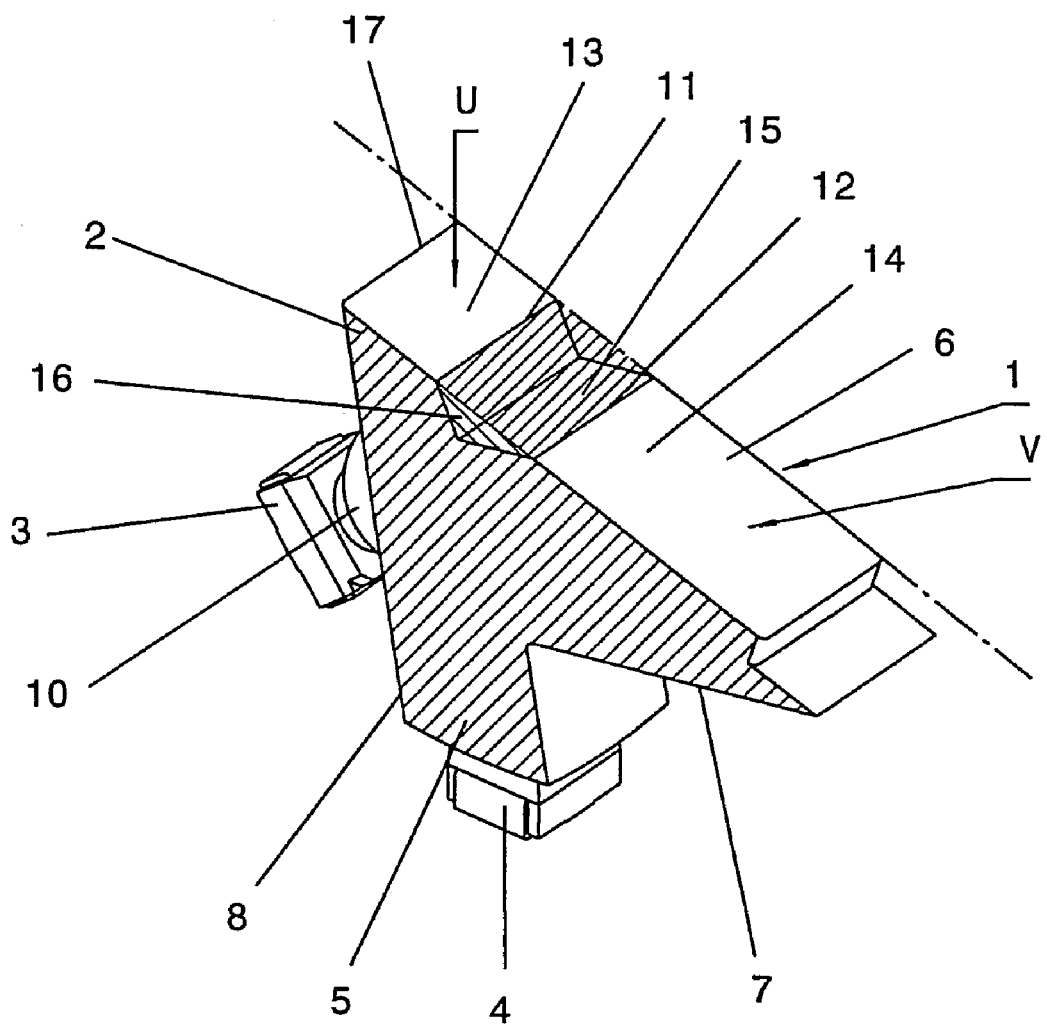
FIG. 2 is a three-dimensional view of an ambient light sensor system designed according to the invention, which is shown in partial section.

FIG. 2 shows a three-dimensional view of the inventively designed ambient light sensor system 1, wherein the light guide element 2 is represented in section by way of example. The essentially triangular form of the light guide element 2, with the projection 5 molded thereto and the molded feature 10, is clearly visible.

The selective detection of the light U, V incident on the ambient light sensor system 1 takes place primarily by the means that the side 6 of the light element 2 facing the transparent surface is divided into an upper region 13 and a lower region 14 by two edges 11, 12. The region 15 located between the two edges 11, 12 is impermeable to the light incident on the motor vehicle, but in this regard only to the spectral region of the light corresponding to the spectral region that is detectable by the sensors 3, 4. As a result of the region 15, two regions 13, 14 are formed on the surface 6, which regions can be unambiguously used in an upper region 13 for detecting the ambient light U and a lower region 14 for detecting the forward-area light V. The light of the forward area is incident on the vehicle essentially horizontally with respect to the vehicle, and thus likewise on the windshield and the lower region 14 of the light guide element 2.

The light of the forward area V is guided through the lower region 14 into the light guide element 2, and is focused in the direction of the sensor 3 by means of the molded feature 10. The sensor 3 here can be positioned relative to the molded feature 10 as a function of the slope of the windshield and the arrangement of the ambient light sensor system 1 in the motor vehicle. The unambiguously selective detection of the forward-area light V is supported by an advantageous design of the region 15, which in an advantageous embodiment of the invention is designed as a V-shaped groove. In this context, the groove 16 is completely filled with a material that is impermeable in the visible spectral region. Impermeable in the visible spectral region in this case means, as already described above, that the filling material for the groove 16 filters out only the spectral region that is detectable by means of the sensors 3, 4 from the light incident on the ambient light sensor. For other spectral regions, this material may represent a light guide. From the first edge 11 to the top end 17 of the light guide element, the ambient light U strikes the guide element 2 in such a manner that it is guided through the light guide element 2 and through the projection to reach the photosensitive sensor 4, so that it is detected and evaluated by means of the photosensitive sensor 4.

The preferred embodiment of the invention shown in FIG. 2 makes possible a very precise, selective detection of the light in the area V in front of the motor vehicle and of the ambient light U. Due to the V-shaped arrangement of a region between the edges 11, 12 in the light guide element 2, scattered radiation in the light guide element 2 is essentially suppressed, so that extremely precise detection of the light in the area V in front of the motor vehicle and of the ambient light U can be undertaken. Precise detection here takes place, for example, for the forward-area light V due to the arrangement of the lower region 14 on the light guide element, the lower edge 12, the V-shaped groove 16, the shadows on the boundary surfaces 7, 8, and by means of the focusing by the molded feature 10. Similarly, the precise and inventive detection of ambient light U results from the interaction of the upper region 13 above the upper edge 11, the region 15, the V-shaped groove 16, the projection 5, and the shadows 7, 8 of the boundary surfaces 7, 8 surrounding the light guide element 2. Additionally, it must still be noted that the embodiment in FIGS. 1 and 2 is merely an example embodiment, and variations are equally possible.

Figure 3:
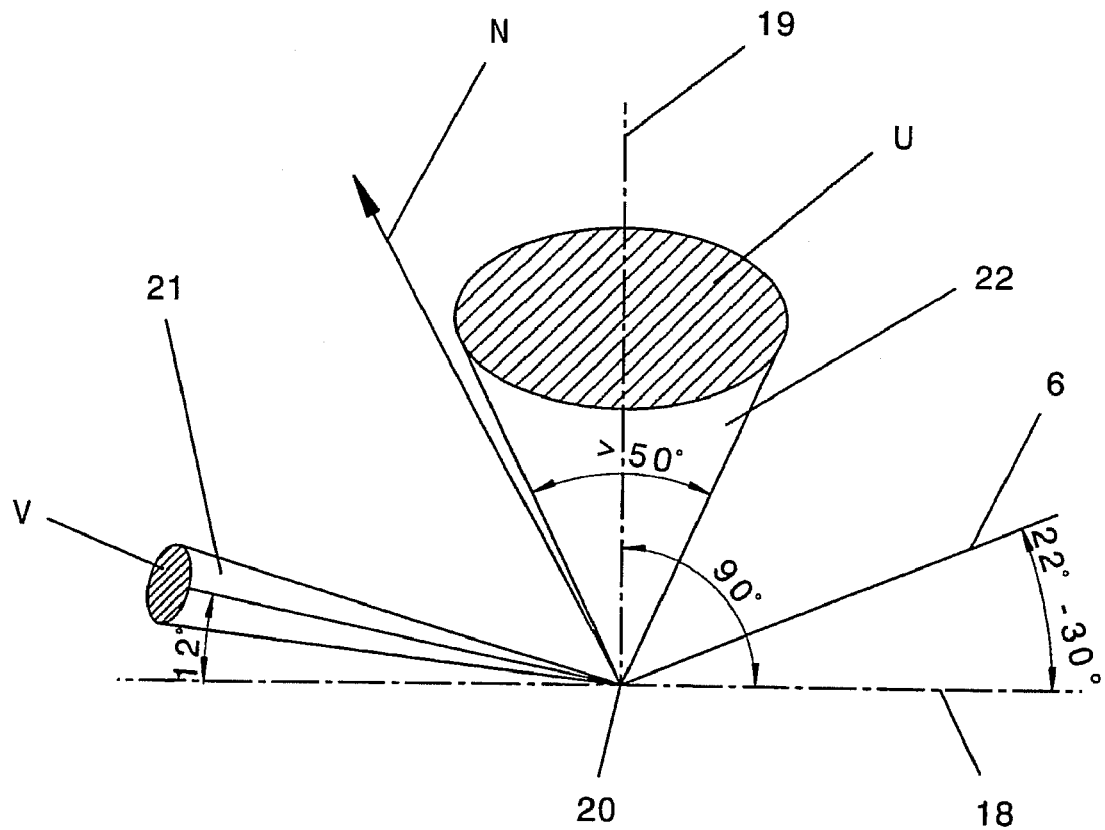
FIG. 3 is a schematic representation of how light is sensed in the area in front of the vehicle and the surroundings of the motor vehicle.

In FIG. 3, a horizontal line 18 and a vertical line 19 are represented as dotted-and-dashed lines with reference to a path of the windshield 6. The horizontal line 18 also represents an essentially horizontal direction of the motor vehicle's roadway. An inventive ambient light sensor system 1 is arranged at the point 20, and thus at the intersection of the horizontal line 18 and the vertical line 19, behind the windshield, which is not shown. In this context, FIG. 3 shows the angle range 21 of a forward-area light sensor system 1 having a sensor 3 for the forward-area light V behind a molded feature 10 as well as the detectable angle range 22 of the ambient light sensor 4. A perpendicular N with reference to the path 6 of the windshield is also shown. The angle range of the arrangement of the windshield in a motor vehicle as shown here is between 22° and 30° to the horizontal line 18. An angle range 22 that detects the ambient light U is shown proceeding from the horizontal line 18, is offset by 90°, and is essentially larger than 50°.

In this example embodiment, the sensors 3 for detecting the light V in the area in front of the motor vehicle are arranged such that an angle range about an angle of approximately 12° can be detected.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An ambient light sensor system for sensing ambient light and light in an area in front of a motor vehicle, the ambient light sensor system comprising:
   a light guide element arranged behind a transparent area of the motor vehicle;
   at least two sensors arranged on the light guide element; the light guide element comprising a light conducting body and an impermeable body of a material that is impermeable to a spectral region of the light detected by the at least two sensors, and
   a surface area delimiting the light guide element and being attached to the transparent area, the surface area is continuous and comprises a first surface region of the light conducting body, a second surface region of the light conducting body and an outer surface of the impermeable body, arranged between the first surface region and the second surface region,
   wherein the light conducting body comprises at least two edges provided in a surface area, wherein a first edge delimits the first surface region through which ambient light is conducted into the light guide element and is guided to the first one of the at least two sensors, and wherein a second edge delimits the second surface region through which the light in a forward area is conducted into the light guide element and guided to a second one of the at least two sensors.

2. The ambient light sensor system according to claim 1, wherein the light guide element is arranged behind a windshield, and wherein the second one of at least two sensors arranged behind a side that is perpendicular to the horizontal detects the forward-area light, and wherein the first one of at least two sensors arranged behind a horizontal side detects the ambient light.

3. The ambient light sensor system according to claim 1, wherein a projection is molded on a triangular light guide element in a direction of the first one of at least two sensors.

4. The ambient light sensor system according to claim 1, wherein a spherical, domed or lenticular molded feature facing in the direction of the second one of at least two sensors is molded on the light guide element.

5. The ambient light sensor system according to claim 4, wherein the second one of at least two sensors arranged in the vicinity of the molded feature is a photodiode, via which a predefinable angle range is evaluated.

6. The ambient light sensor system according to claim 1, wherein the light guide element is provided with a light-absorbing material on surfaces that delimit the light guide element outside the light entry and light exit surfaces.

7. The ambient light sensor system according to claim 1, wherein the area provided between the two edges comprises a first surface and a second surface angled with respect to the first surface.

8. The ambient light sensor system according to claim 1, wherein the area provided between the two edges comprises a first surface extending from the first edge and a second surface extending from the second edge and meeting the first surface at an angle.

9. The ambient light sensor system according to claim 7, wherein a volume defined by the first surface, the second surface, and a plane of the surface area of the light guide element that is associated with the transparent area is substantially filled with the material that is impermeable a spectral region of the light detected by the sensors.

10. An ambient light sensor system for sensing ambient light and light in an area in front of a motor vehicle, the ambient light sensor system comprising:
    a light guide element arranged behind a transparent area of the motor vehicle;
    at least two sensors arranged on the light guide element the light guide element comprising a light conducting body and an impermeable body of a material that is impermeable to a spectral region of the light detected by the at least two sensors, and
    a surface area delimiting the light guide element and being attached to the transparent area, the surface area is continuous and comprises a first surface region of the light conducting body, a second surface region of the light conducting body and an outer surface of the impermeable body, arranged between the first surface region and the second surface region, wherein the light conducting body comprises at least two edges provided in a surface area, wherein a first edge includes a first end spaced from a second end and delimits the first surface region through which ambient light is conducted into the light guide element and is guided to the first one of the at least two sensors, and wherein a second edge includes a first end spaced from a second end and delimits the second surface region through which the light in a forward area is conducted into the light guide element, to a second one of the at least two sensors.

11. The ambient light sensor system according to claim 10, wherein the light guide element has a shape that is essentially triangular in cross-section, and wherein the first one of at least two sensors is arranged behind a first side of the triangle and the second one of the at least two sensors is arranged behind a second side of the triangle.

12. The ambient light sensor system according to claim 11, wherein the light guide element is arranged behind a windshield, and wherein the second one of the at least two sensors arranged behind a side that is perpendicular to a horizontal side detects the forward-area light, and wherein the first one of the at least two sensors arranged behind the horizontal side detects the ambient light.

13. The ambient light sensor system according to claim 11, wherein a projection is molded on the triangular light guide element in a direction of the first one of the at least two sensors.

14. The ambient light sensor system according to claim 11, wherein a spherical, domed or lenticular molded feature facing in the direction of the second one of the at least two sensors is molded on the light guide element.

15. An ambient light sensor system for sensing ambient light and light in an area in front of a motor vehicle, the ambient light sensor system comprising:

a light guide element having a first surface adapted to face a transparent area of the motor vehicle, the first surface having a first region adapted to receive ambient light and a second region spaced from the first region and adapted to receive light from in front of the motor vehicle, the first surface including a notch between the first region and the second region;

a first sensor and a second sensor arranged on the light guide element; and a first light guide path from the first region to the first sensor;

a second light guide path from the second region to the second sensor, the second light guide path being perpendicular to and intersecting the first light guide path; and the first light guide path being partially defined by a first wall of the notch and the second light guide path being partially defined by a second wall of the notch.

16. The ambient light sensor system according to claim 15, wherein the first and second walls are coated with a material that is impermeable to a spectral region of the light detected by the sensors.

17. The ambient light sensor system according to claim 15, wherein the notch is substantially filled with a material that is impermeable to a spectral region of the light detected by the sensors.

18. The ambient light sensor system according to claim 17, wherein the material comprises a block of material having the shape of a triangular prism.

19. The ambient light sensor system according to claim 1, wherein the light guide element guides substantially only the ambient light conducted through the first surface region to the first one of the at least two sensors, and wherein the light guide element guides substantially only the light in the forward area conducted through the second surface region to the second one of the at least two sensors.

20. The ambient light sensor system according to claim 15, wherein the first light guide path guides substantially only the ambient light received through the first region to the first sensor, and wherein the second light guide path guides substantially only the light received from the front of the motor vehicle through the second region to the second sensor.

* * * * *